United States Patent
Thomas (10) Patent No.: US 10,383,321 B2
(45) Date of Patent: Aug. 20, 2019

(54) FISHING ROD HANDLE ASSEMBLY

(71) Applicant: Todd Douglas Thomas, Piedmont, OK (US)

(72) Inventor: Todd Douglas Thomas, Piedmont, OK (US)

(*) Notice: Subject to any disclaimer, the term of this patent is extended or adjusted under 35 U.S.C. 154(b) by 194 days.

(21) Appl. No.: 15/788,908

(22) Filed: Oct. 20, 2017

(65) Prior Publication Data

US 2019/0116773 A1    Apr. 25, 2019

(51) Int. Cl.
*A01K 87/08* (2006.01)
*A01K 89/015* (2006.01)
*A01K 87/06* (2006.01)

(52) U.S. Cl.
CPC ........ *A01K 89/01914* (2015.05); *A01K 87/06* (2013.01); *A01K 87/08* (2013.01)

(58) Field of Classification Search
CPC ................................ A01K 87/06; A01K 87/08
See application file for complete search history.

(56) References Cited

U.S. PATENT DOCUMENTS

| | | | |
|---|---|---|---|
| 2,761,236 A * | 9/1956 | Gaston | A01K 87/08 43/25 |
| 4,860,483 A | 8/1989 | Hlad | |
| 5,363,586 A | 11/1994 | Balkenbush | |
| D356,622 S | 3/1995 | Balkenbush | |
| 5,426,884 A | 6/1995 | Makowsky | |
| 5,581,931 A * | 12/1996 | Swisher | A01K 87/08 43/21.2 |
| 6,237,274 B1 * | 5/2001 | Head | B25G 1/06 43/25 |
| D447,534 S * | 9/2001 | Wackowski | D22/147 |
| 6,748,691 B2 * | 6/2004 | Doucette | A01K 87/08 43/21.2 |
| 7,854,086 B2 | 12/2010 | Huynh | |
| 9,119,385 B2 | 9/2015 | Cooper | |
| 2003/0131481 A1 | 7/2003 | Sullivan | |
| 2015/0272100 A1 * | 10/2015 | Bournique | A01K 87/08 43/18.1 CT |
| 2017/0367309 A1 * | 12/2017 | Morris | A01K 87/08 |
| 2019/0059345 A1 * | 2/2019 | Flinsky | A01K 87/08 |

* cited by examiner

*Primary Examiner* — Richard G Davis
(74) *Attorney, Agent, or Firm* — D. Ward Hobson (57) ABSTRACT

A fishing rod handle assembly configured to provide increased safety, strength and control and which may be used in combination with standard fishing rods. The fishing rod handle assembly generally includes a handle positioned transverse to the position of the standard fishing rod, such that a fisherman can utilize both hands in a side-by-side orientation for increased control and strength when pulling up on the standard fishing rod and reeling in fish. Further, the fishing rod handle assembly generally includes one or more collars connected to the handle, the one or more collars having splined recesses therein for detachably connecting the standard fishing rod to the fishing rod handle assembly, such that the fishing rod handle assembly firmly grips the standard fishing rod to prevent twisting, but does not damage or break the standard fishing rod.

7 Claims, 6 Drawing Sheets

FISHING ROD HANDLE ASSEMBLY

BACKGROUND

Standard fishing rods and fishing rod handle assemblies typically consist of a rod having a top side, a bottom side and a vertical handle or handles connected towards the rear of the rod. A fishing reel, having fishing line wound thereon, is typically mounted on the upper or lower surface of the handle and is positioned towards the rear of the rod. The portion of the handle rearward of the reel is typically held by a fisherman during casting. The portion of the handle mounted forward of the reel, if any, may be held by a fisherman for additional stability and control. The handle or handles of the rod are generally oriented in a substantially straight or vertical line along the path of the rod, such that a fisherman's hands are positioned one in front of the other.

While this configuration may work well for shallow water fishing, for small fish, it creates numerous problems for deep sea fishing, for large fish. Because deep sea fishing typically takes place out in the ocean, on a moving boat and far away from land, safety, balance and control are vitally important when reeling in large fish. During reeling, the deep sea fisherman must typically place one hand forward of the reel and one hand rearward of the reel to pull up on the rod due to the downward force being applied by larger fish. Further, as the deep sea fisherman reels in a fish, the fishing line moves farther away from the center of the reel spool and horizontally on the reel, creating a greater tendency to pull the rod downward and side-to-side as the fishing line moves back and forth across the reel spool. Because the deep sea fisherman's hands are positioned one in front of the other, extra effort must be used to resist such downward and side-to-side forces, which is awkward and tiring. Moreover, pulling upward on the rod while the deep sea fisherman's hands are oriented along the path of the rod and in the way of the fishing line can injure the deep sea fisherman, cause the deep sea fisherman to lose balance and fall, or cause the rod to break or the fishing line to snap.

To that end, it would be advantageous to provide an improved fishing rod handle assembly configured to provide increased safety, strength and control and which may be used in combination with standard fishing rods and standard handle assemblies. The improved fishing rod handle assembly disclosed herein is generally configured to detachably connect to a standard fishing rod. The improved fishing rod handle assembly generally includes a handle positioned transverse to the position of the rod, such that a fisherman can utilize both hands in a side-by-side orientation for increased control and strength when pulling up on the rod and reeling in a fish. Further, the improved fishing rod handle assembly generally includes one or more collars connected to the handle, the one or more collars having splined recesses therein for detachably connecting the improved fishing rod handle assembly to the rod, such that the improved fishing rod handle assembly firmly grips the rod to prevent twisting, but does not damage or break the rod. It is to such an improved fishing rod handle assembly and to methods of using thereof that exemplary embodiments of the inventive concepts disclosed and claimed herein are directed.

BRIEF DESCRIPTION OF THE SEVERAL VIEWS OF THE DRAWINGS

Like reference numerals in the figures represent and refer to the same or similar element or function. Implementations of the disclosure may be better understood when consideration is given to the following detailed description thereof. Such description makes reference to the annexed pictorial illustrations, schematics, graphs, drawings, and appendices. In the drawings.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangements of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description and should not be regarded as limiting the inventive concepts claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features have not been described in detail to avoid unnecessarily complicating the instant disclosure.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed.

Further, unless expressly stated to the contrary, "or" refers to an inclusive or and not to an exclusive or. For example, a condition A or B is satisfied by anyone of the following:

A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The inventive concepts disclosed herein are generally directed to a fishing rod handle assembly configured to be attached to a standard fishing rod. The fishing rod handle assembly generally includes a handle positioned transverse to the position of the rod, such that a user can utilize both hands in a side-by-side orientation for increased control and strength when pulling up on the rod and reeling in a fish. Further, the fishing rod handle assembly generally includes one or more collars connected to the handle, the one or more collars having splined recesses therein for detachably connecting the fishing rod handle assembly to the rod, such that the fishing rod handle assembly firmly grips the rod to prevent twisting, but does not damage or break the rod.

In some embodiments, the fishing rod handle assembly includes a curved handle having a first end and a second end, a top collar member extending between the first end and the second end of the curved handle and a bottom collar member detachably connected to the top collar member. The top collar member and the bottom collar member each include a splined recess therein for receiving and cooperatively gripping a fishing rod therebetween.

When a fishing rod is connected to the fishing rod handle assembly, the fishing rod is positioned transverse to the position of the curved handle so that a user may grip the curved handle with both hands in a side-by-side orientation for improved strength, balance, safety and control. The splined recesses in the top collar member and bottom collar member permit the fishing rod to be gripped and held firmly in place by the fishing rod handle assembly to reduce twisting and breaking of the rod when downward and side-to-side forces are applied thereto.

In some embodiments, the top collar member of the fishing rod handle assembly includes a line-guide for guiding a fishing line therethrough. The line-guide positioned on a top portion of the top collar member and raised a substantially short distance above the top collar member so as to permit the curved handle to also be positioned a substantially short distance above the fishing rod. In some embodiments, the line-guide is substantially rectangular so as to permit the fishing line to move side-to-side and across the reel spool while still being guided by the line-guide. Further, in some embodiments, the top collar member is angled to provide additional safety, control and strength. Further, in some embodiments, a middle portion of the curved handle is vertically offset from the first end and the second end of the curved handle to provide additional strength and control. Further, in some embodiments, the fishing rod handle assembly includes a first leg member and a second leg member detachably connected to the top collar member and extending below the first end and the second end of the curved handle. The first leg member and second leg member configured to permit a fisherman to rest or position the first leg member and second leg member on the side of a boat or other surface to provide additional safety, support, control and leverage during fishing.

FIGS. 1-8, depict an exemplary embodiment of a fishing rod handle assembly (100) constructed according to the inventive concepts disclosed herein. As shown therein, the fishing rod handle assembly (100) includes a curved handle (105) having a first end (110) a second end (115) and a middle portion (120) extending therebetween. The middle portion (120) of the curved handle (105) is vertically offset from the first end (110) and the second end (115). The curved handle (105) configured for grasping by a fisherman with both hands in a side-by-side position and for preventing twisting of the fishing rod (155) caused by reeling.

The fishing rod handle assembly (100) further includes an angled top collar member (125) having a first lower end (130), an upper middle portion (135) and a second lower end (140). The upper middle portion (135) having a first splined recess (145) therein for gripping the fishing rod (155). The first lower end (130) of the angled top collar member (125) detachably connected to the first end (110) of the curved handle (105) and the second lower end (140) of the angled top collar member (125) detachably connected to the second end (115) of the curved handle (105) such that the angled top collar member (125) extends between the first end (110) and the second end (115) of the curved handle (105).

The fishing rod handle assembly (100) further includes a bottom collar member (160) having a second splined recess (165) therein for gripping the fishing rod (155). The bottom collar member (160) detachably connected to the upper middle portion (135) of the angled top collar member (125). The first splined recess (145) of the angled top collar member (125) and the second splined recess (165) of the bottom collar member (160) are configured to detachably grip the fishing rod (155) in a position substantially transverse to the position of the curved handle (105).

The fishing rod handle assembly (100) further includes a substantially rectangular low-rise line-guide (185) for guiding a fishing line (190) therethrough. The substantially low-rise line-guide (185) for controlling the side to side effect of reeling and configured to permit the curved handle (105) to be raised a substantially short distance above the fishing rod (155). The substantially rectangular low-rise line-guide (185) connected to the top of the upper middle portion (135) of the angled top collar member (125).

The fishing rod handle assembly (100) further includes a first leg member (205) and a second leg member (220). The first leg member (205) detachably connected to and extending below the first lower end (130) of the angled top collar member (125). The first leg member (205) configured to support the fishing rod handle assembly (100) on a surface (215). The second leg member (220) detachably connected to and extending below the second lower end (140) of the angled top collar member (125). The second leg member (220) configured to support the fishing rod handle assembly (100) on the surface (215).

Figure 1:
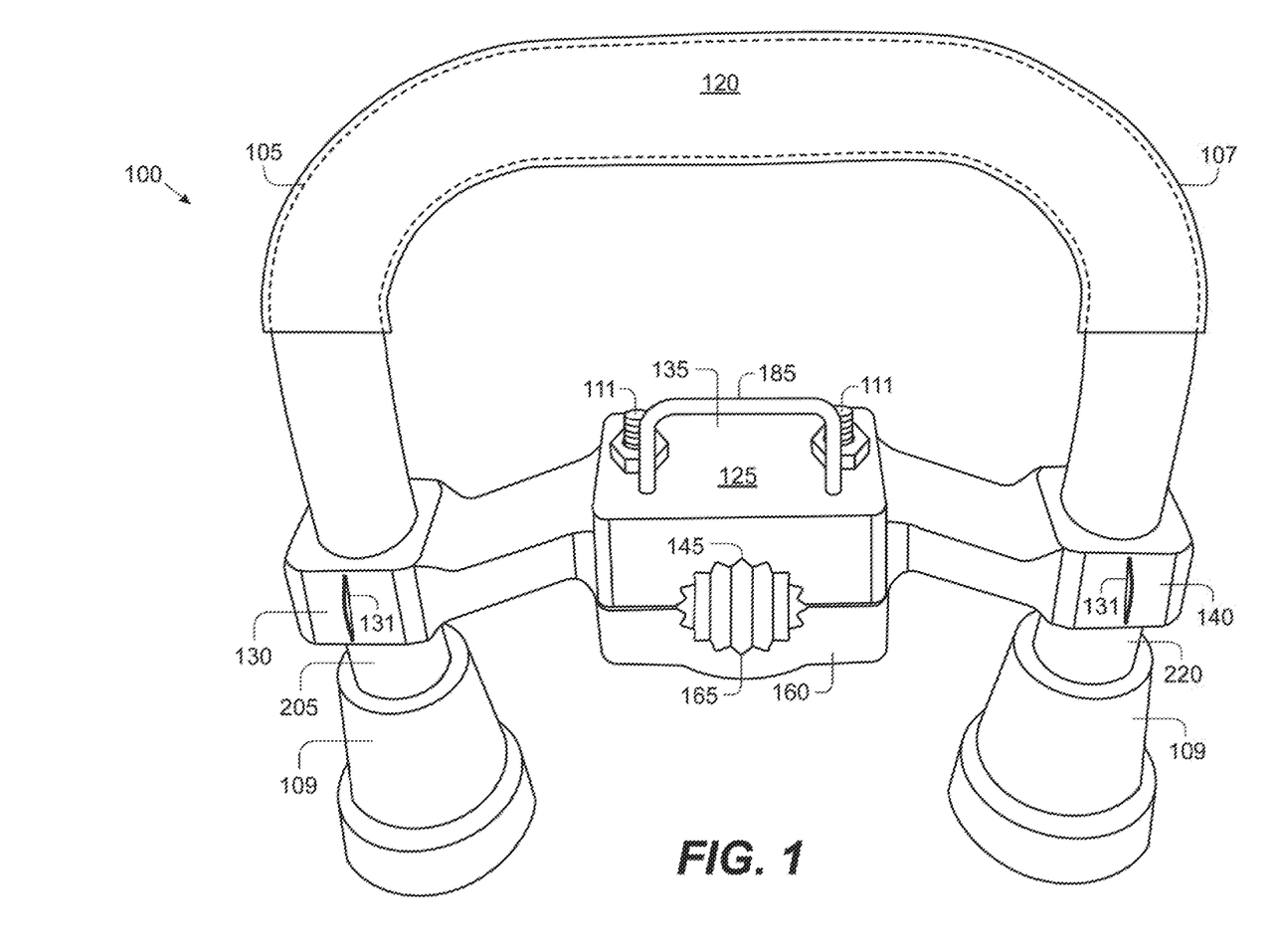
FIG. 1 is a front perspective view of an exemplary embodiment of a fishing rod handle assembly according to the inventive concepts disclosed herein.
Figure 2:
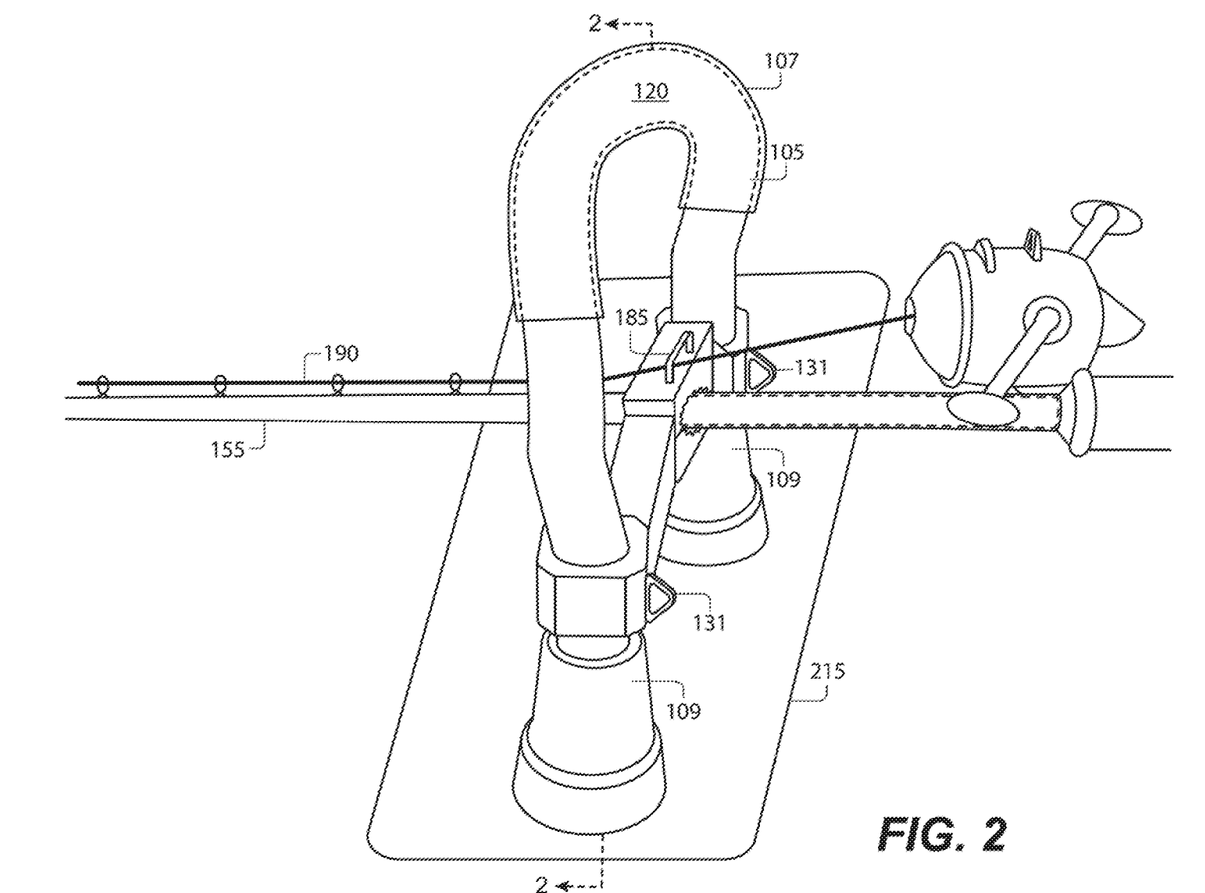
FIG. 2 is a side perspective view of the fishing rod handle assembly of FIG. 1 connected to a standard fishing rod.

Referring now to FIGS. 1-2, shown therein is a front perspective view of the fishing rod handle assembly (100) and a side perspective view of the fishing rod handle assembly (100) connected to a standard fishing rod (155). The fishing rod handle assembly (100) includes a curved handle (105) having a first end (110) (shown in FIG. 3) a second end (115) (shown in FIG. 3) and a middle portion (120) extending therebetween. The middle portion (120) of the curved handle (105) is vertically offset (shown in FIGS.

Figure 3:
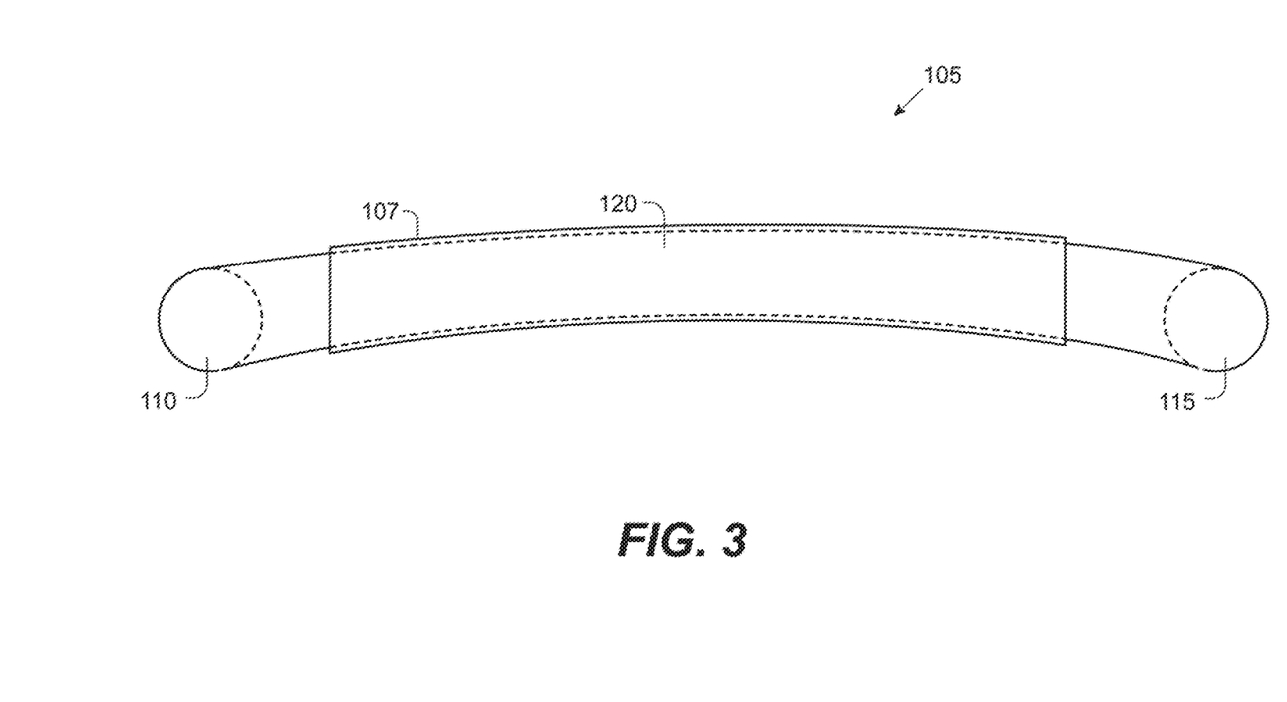
FIG. 3 is a top view of a curved handle of an embodiment of a fishing rod handle assembly according to the inventive concepts disclosed herein.

2 and 3) from the first end (110) and the second end (115). The curved handle (105) is configured for grasping by a fisherman with both hands in a side-by-side position and for preventing twisting of the fishing rod (155) caused by reeling.

The fishing rod handle assembly (100) further includes an angled top collar member (125) having a first lower end (130), an upper middle portion (135) and a second lower end (140). The upper middle portion (135) having a first splined recess (145) therein for gripping the fishing rod (155). The first lower end (130) of the angled top collar member (125) detachably connected to the first end (110) of the curved handle (105) and the second lower end (140) of the angled top collar member (125) detachably connected to the second end (115) of the curved handle (105) such that the angled top collar member (125) extends between the first end (110) and the second end (115) of the curved handle (105).

The fishing rod handle assembly (100) further includes a bottom collar member (160) having a second splined recess (165) therein for gripping the fishing rod (155). The bottom collar member (160) detachably connected to the upper middle portion (135) of the angled top collar member (125). The first splined recess (145) of the angled top collar member (125) and the second splined recess (165) of the bottom collar member (160) are configured to detachably grip the fishing rod (155) in a position substantially transverse to the position of the curved handle (105).

The fishing rod handle assembly (100) further includes a substantially rectangular low-rise line-guide (185) for guiding a fishing line (190) therethrough. The substantially low-rise line-guide (185) for controlling the side to side effect of reeling the fishing line (190) and configured to permit the curved handle (105) to maintain a substantially low elevation above the fishing rod (155), the substantially rectangular low-rise line-guide (185) connected to the upper middle portion (135) of the angled top collar member (125).

The fishing rod handle assembly (100) further includes a first leg member (205) and a second leg member (220). The first leg member (205) detachably connected to and extending below the first lower end (130) of the angled top collar member (125). The first leg member (205) configured to support the fishing rod handle assembly (100) on a surface (215). The second leg member (220) detachably connected to and extending below the second lower end (140) of the angled top collar member (125). The second leg member (220) configured to support the fishing rod handle assembly (100) on the surface (215).

The fishing rod handle assembly (100) may be constructed from any desired material that is sufficiently lightweight, strong and durable. The material used should be of a sufficient strength, flexibility and durability to permit a fisherman to pull upward and side-to-side on the fishing rod handle assembly (100) during deep sea fishing without damaging or breaking the fishing rod handle assembly (100) or the fishing rod (155). Further, the material used should be sufficiently durable to withstand repeated use and exposure to outdoor elements such as ocean water, rain, salt, heat and sun light.

Preferably, the fishing rod handle assembly (100) is constructed from plastic, fiberglass, graphite, or carbon fiber. Plastic, fiberglass, graphite and carbon fiber are rigid, yet flexible, and non-conductive making them a preferred material for construction of the fishing rod handle assembly (100). It should be understood, however, that the fishing rod handle assembly (100) may be constructed from any material that is sufficiently durable, strong and lightweight. For example, the fishing rod handle assembly (100) may be constructed from metals, alloys, wood, plastics, composite materials, resins, synthetic fiber, carbon fiber, reinforced fiber, reinforced composite material, combinations thereof and the like. Further in some embodiments, the fishing rod handle assembly (100) may include reinforcing or bracing structures to increase the strength and durability of the fishing rod handle assembly (100), such as struts, ribs, braces, rods, or any other suitable reinforcing or bracing structure, or combinations thereof and the like.

In some embodiments, the fishing rod handle assembly (100) may also include one or more harness ring (131) for connecting one or more harness thereto. In some embodiments, the fishing rod handle assembly (100) includes a first harness ring (131) connected to the first lower end (130) of the angled top collar member (125) and a second harness ring (131) connected to the second lower end (140) of the angled top collar member (125). The first harness ring (131) and the second harness ring (131) are configured to detachably connect one or more harness thereto for increased leverage and support during fishing. The harness ring (131) may be formed as a "D" or "U" shaped ring, loop, hook, snap or other similar type of connection sufficient to permit a harness, cable, rope or the like to be detachably connected thereto. The harness ring (131) may be constructed from any type of material sufficient to support the fishing rod handle assembly (100) when connected to a fishing rod, such as fishing rod (155). For example, the harness ring (131) may be constructed from metals, plastics, alloys, wood, composite materials, resins, synthetic fiber, carbon fiber, reinforced fiber, reinforced composite material, combinations thereof and the like. In use, a shoulder or waist harness may be secured and positioned around a person and connected to the fishing rod handle assembly (100) via the one or more harness ring (131). The harness may also be connected to the reel of the fishing rod via one or more loops or hooks positioned on the reel of the fishing rod. When the harness is connected to the fishing rod handle assembly (100), the harness provides a fisherman with additional support, leverage and safety during fishing.

Referring now to FIG. 3, shown therein is a top view of the curved handle (105) of the fishing rod handle assembly (100). The curved handle 105 has a first end (110) a second end (115) and a middle portion (120) extending therebetween. The middle portion (120) of the curved handle (105) is vertically offset from the first end (110) and the second end (115), such that the middle portion (120) is angled away from the first end (110) and the second end (115). The vertical offset is configured to provide a fisherman with a mechanical advantage, or force amplification, when pulling upward on the curved handle (105), so as to provide the fisherman with greater efficiency and control over the fishing rod (155).

Preferably, the curve or angle of the curved handle (105) is substantially U shaped, with the first end (110) and the second end (115) at the top of the U and the middle portion (120) at the bottom of the U. However, it should be understood that the curve of the curved handle (105) may have any desired angle or curvature, including but not limited to ninety degree angles so long as the middle portion (120) of the curved handle (105) may be gripped by a fisherman with two hands in a substantially side-by-side position and such that the positon of the curved handle (105) is transverse to the position of the rod (155).

The material used for construction of the curved handle (105) may be any desired material sufficient to permit a fisherman to grasp and pull up on the curved handle (105) using both hands in a side-by-side orientation without breaking or damaging the curved handle (105), the fishing rod handle assembly (100) or the fishing rod (155). Preferably, the curved handle (105) is constructed from plastic, fiberglass, graphite, or carbon fiber. Plastic, fiberglass, graphite and carbon fiber are rigid, yet flexible, and non-conductive making them a preferred material for construction of the curved handle (105). It should be understood, however, that the curved handle (105) may be constructed from any material that is sufficiently durable, strong and lightweight. For example, the curved handle (105) may be constructed from metals, alloys, wood, composite materials, resins, synthetic fiber, reinforced fiber, reinforced composite material, combinations thereof and the like. Further in some embodiments, the curved handle (105) may include reinforcing or bracing structures to increase the strength and durability of the curved handle (105), such as struts, ribs, braces, rods, or any other suitable reinforcing or bracing structure, or combinations thereof and the like.

The curved handle (105) is shown as having a substantially tubular shape. It should be understood, however, that the curved handle (105) may be any desired shape sufficient to be easily grasped with two hands in a side by side orientation by a fisherman. For example, the curved handle (105) may have a substantially rectangular, square or triangular shape in some embodiments. Further, in some embodiments, the curved handle (105) includes gripping or padding (107) attached thereto or embedded therein. The gripping or padding (107) may be formed from the same or similar material as the curved handle (105) or may be formed from a different material. Preferably, the gripping or padding (107) is formed from rubber, foam or the like, for example. The gripping or padding (107) may also be formed integrally with the curved handle (105). For example, the gripping or padding (107) may be formed by making hatch marks or similar indentations carved or embedded into the curved handle (1.05). Further, the gripping or padding (107) may be inserted into and protrude out from the curved handle (105).

Figure 4:
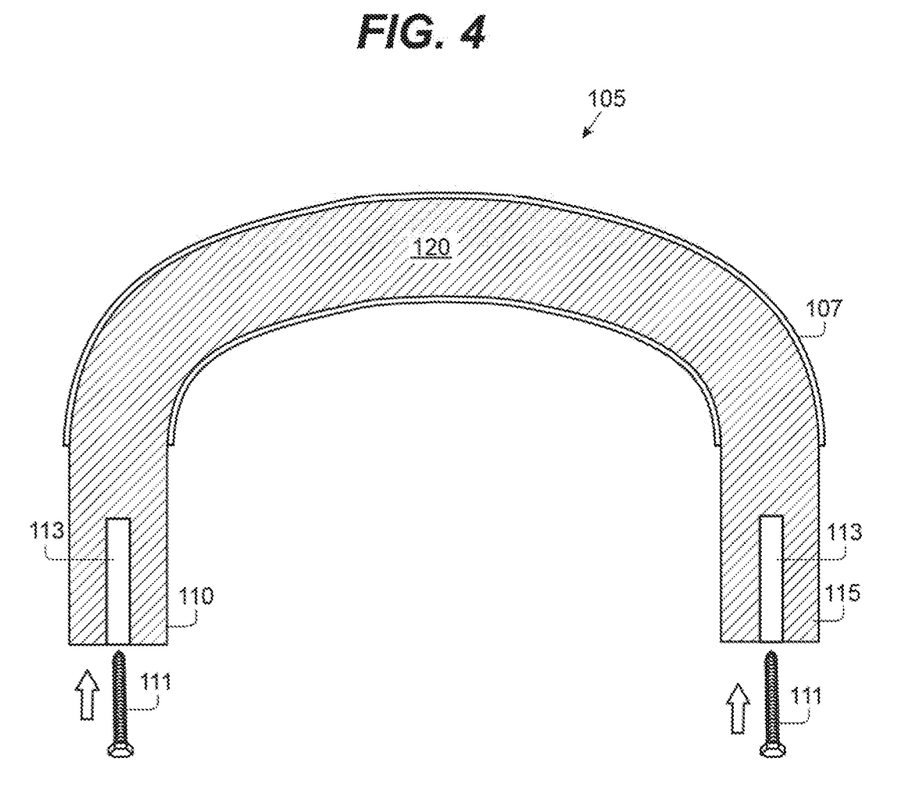
FIG. 4 is a front cross-sectional view of a curved handle of an embodiment of a fishing rod handle assembly according to the inventive concepts disclosed herein taken along line 2-2 of FIG. 2.
Figure 5:
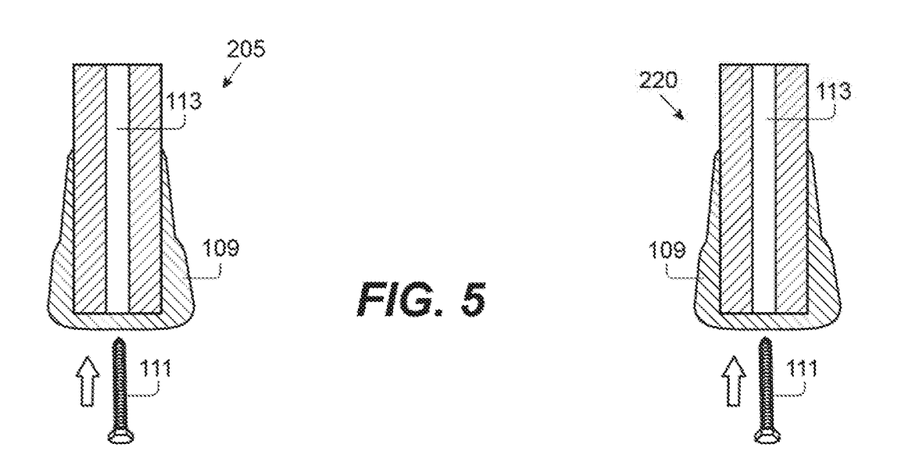
FIG. 5 is a front cross-sectional view of a first leg member and a second leg member of an embodiment of a fishing rod handle assembly according to the inventive concepts disclosed herein taken along line 2-2 of FIG. 2.

Referring now to FIGS. 4-5, shown therein is a cross sectional view taken along line 2-2 of FIG. 2 of the curved handle (105) and a cross sectional view taken along line 2-2 of FIG. 2 of the first leg member (205) and second leg member (220) of the fishing rod handle assembly (100). The curved handle (105) has a first end (110) a second end (115) and a middle portion (120) extending therebetween. The first leg member (205) detachably connected to and extending below the first lower end (130) of the angled top collar member (125). The first leg member (205) configured to support the fishing rod handle assembly (100) on a surface (215). The second leg member (220) detachably connected to and extending below the second lower end (140) of the angled top collar member (125). The second leg member (220) configured to support the fishing rod handle assembly (100) on the surface (215).

To detachably connect the curved handle (105) to the angled top collar member (125) (as shown in FIGS. 1-2) a screw (111) or bolt, for example, is threaded up and through one or more openings (113) in the first lower end (130) of the angled top collar member (125) and into one or more openings (113) in the first end (110) of the curved handle (105). Another screw (111) or bolt, for example, is then threaded up and through one or more openings (113) in the second lower end (140) of the angled top collar member (125) and into one or more openings (113) in the second end (115) of the curved handle (105). In this manner the curved handle (105) is detachably connected to the angled top collar member (205) (as shown in FIGS. 1-2). However, it is to be appreciated that the curved handle (105) may be attached to the angled top collar member (125) in any desired manner, including for example, via welds, seams, joints, bars, screws, bolts, adhesives, hooks, loops, rings, combinations thereof and the like.

To detachably connect the first leg member (205) to the angled top collar member (125), a screw (111) or bolt, for example, is threaded up and through one or more openings (113) in the bottom of the first leg member (205) through one or more openings (113) in the first lower end (130) of the angled top collar member (125) and through one or more opening (113) in the first end (110) of the curved handle (105). To detachably connect the second leg member (220) to the angled top collar member (125), another screw (111) or bolt, for example, is threaded up and through one or more openings (113) in the bottom of the second leg member (220) through one or more openings (113) in the second lower end (140) of the angled top collar member (125) and through one or more opening (113) in the second end (115) of the curved handle (105). In this manner the second leg member (220) is detachably connected to the angled top collar member (205). However, it is to be appreciated that the first leg member (205) and the second leg member (220) may be attached to the angled top collar member (125) in any desired manner, including for example, via welds, seams, joints, bars, screws, bolts, adhesives, hooks, loops, rings, combinations thereof and the like.

The first leg member (205) and the second leg member (220) are shown as having a substantially tubular shape, similar to the tubular shape of the curved handle (105). It should be understood, however, that the first leg member (205) and the second leg member (220) may have any desired shape sufficient to permit the first leg member (205) and the second leg member (220) to support the fishing rod handle assembly (100) on a surface, including but not limited to, a substantially rectangular, square or triangular shape.

In some embodiments, the first leg member (205) and the second leg member (220) include gripping or padding (109) attached thereto so as to provide additional strength, control and durability. The gripping or padding (109) may be formed from the same or similar material as the gripping or padding (107) used for the curved handle (105) or may be formed from a different material. Preferably, the gripping or padding (109) is formed from rubber or similar material sufficient to permit the first leg member (205) and second leg member (220) to not slip or damage the surface (215), such as the surface of a boat or ledge. The gripping or padding (109) may also be formed integrally with the first leg member (205) and the second leg member (220). For example, the first leg member (205) and second leg member (220) may be constructed from a material that is substantially padded or which has a non-slip coating. Further, the gripping or padding (109) may be formed by making hatch marks or the like carved or embedded into the first leg member (205) and the second leg member (220). Further, the gripping or padding (109) may be inserted into and protruding out from the first leg member (205) and the second leg member (220).

In some embodiments, the first leg member (205) and the second leg member (220) may also be telescopically extendable and retractable, such that the first leg member (205) and the second leg member (220) telescopically extend to a deployed position and retract to a stowed position. For example, the first leg member (205) and the second leg member (220) may each be formed from .a housing that has a first outer diameter a first inner diameter and a second outer diameter and second inner diameter. The second outer diameter of the housing of the first leg member (205) being smaller than the first outer diameter such that the first leg member (205) telescopically retracts into and extends out from the housing of the first leg member (205). Similarly, the second outer diameter of the housing of the second leg member (220) being smaller than the first outer diameter such that the second leg member (220) telescopically retracts into and extends out from the housing of the second leg member (220).

In some embodiments, the curved handle (105) may be substantially hollow, so as to permit the first leg member (205) to telescopically retract into and extend out from the first end (110) of the curved handle (105) and to permit the second leg member (220) to telescopically retract into and extend out from the second end (115) of the curved handle (105). In this manner, the first leg member (205) and second leg member (220) may be efficiently stowed when not in use and efficiently deployed when needed for additional stability, control and support. As will be appreciated by one of ordinary skill in the art having the benefit of the instant disclosure, the first leg member (205) and second leg member (220) may be extended or retracted to any desired length so as to be configured for use with different support structures, such as for example, boats, edges, railings and the like.

Figures 6, 7:
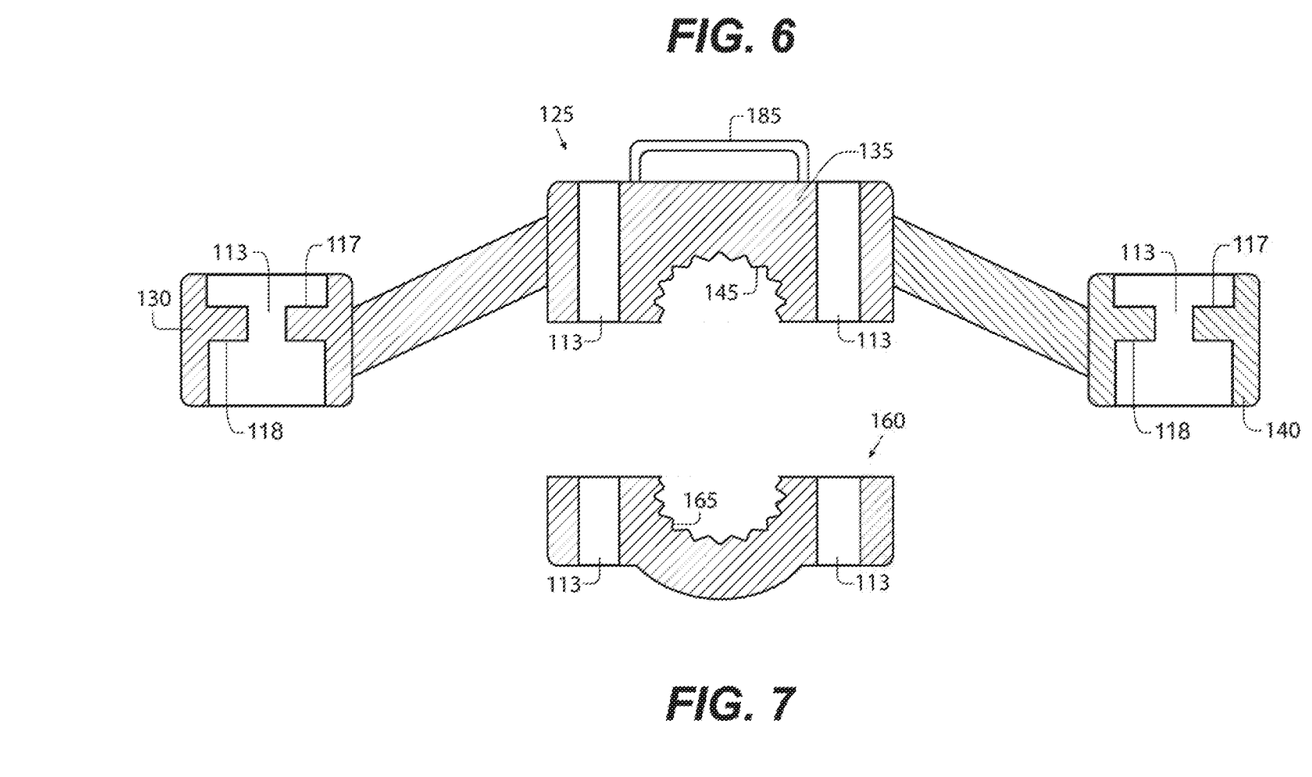
FIG. 6 is a front cross-sectional view of an angled top collar member of an embodiment of a fishing rod handle assembly according to the inventive concepts disclosed herein taken along line 2-2 of FIG. 2.
FIG. 7 is a front cross-sectional view of a bottom collar member of an embodiment of a fishing rod handle assembly according to the inventive concepts disclosed herein taken along line 2-2 of FIG. 2.
Figure 8:
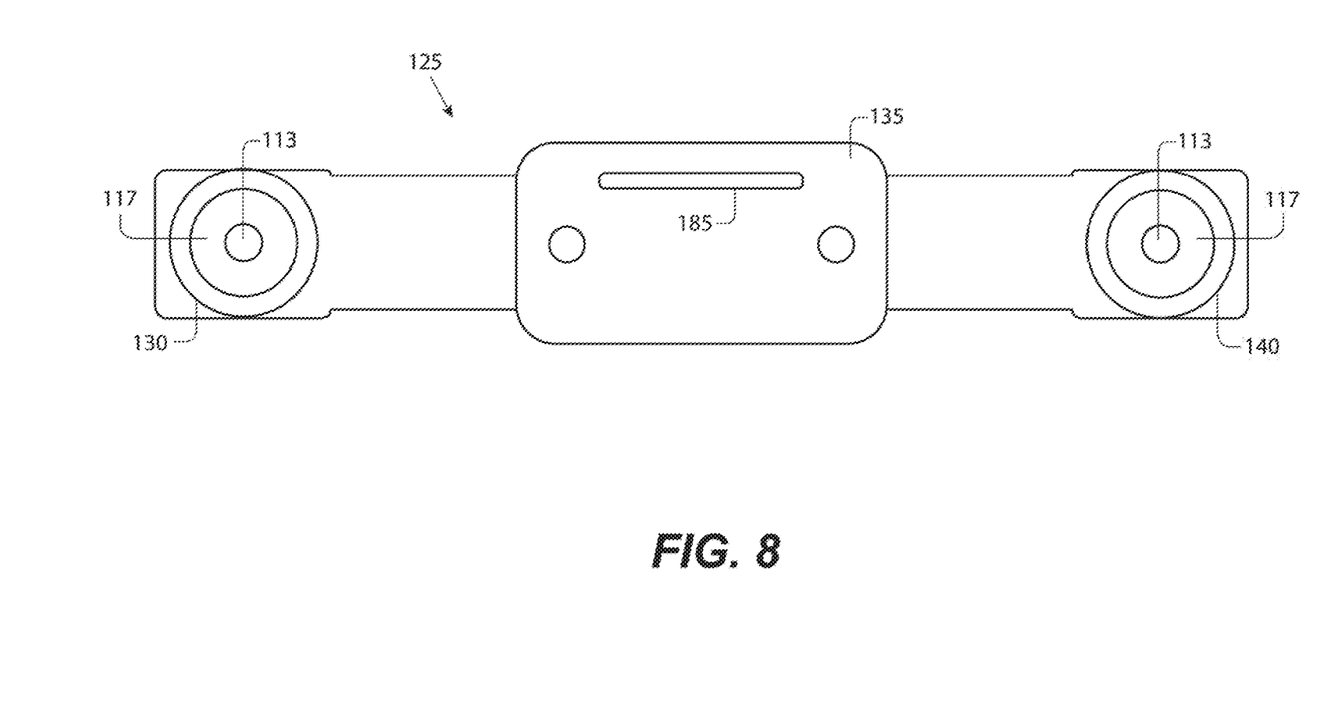
FIG. 8 is a top view of an angled top collar member of an embodiment of a fishing rod handle assembly according to the inventive concepts disclosed herein.

FIGS. 6-7 depict an embodiment of the angled top collar member (125) and the bottom collar member (160) of the fishing rod handle assembly (100) taken along line 2-2 of FIG. 2. FIG. 8 depicts a top view of the angled top collar member (125). As shown in FIGS. 6-8, the angled top collar member (125) includes a first lower end (130), a second lower end (140) and an upper middle portion (135.) extending between the first lower end (130) and the second lower end (140). The upper middle portion (135) having a first splined recess (145) therein for gripping the fishing rod (155). The first splined recess (145) positioned on the bottom of the upper middle portion (135). In some embodiments, the upper middle portion (135) also includes a substantially rectangular low-rise line-guide (185) positioned on top of the upper middle portion (135). The substantially low-rise line-guide for guiding a fishing line (190) therethrough. The substantially low-rise line-guide (185) for controlling the side to side effect of reeling the fishing line (190) and configured to permit the curved handle (105) to maintain a substantially low elevation above the fishing rod (155).

The bottom collar member (160) includes a second splined recess (165) for griping the fishing rod (155). The bottom collar member (160) configured to be detachably connected to the upper middle portion (135) of the angled top collar member (125). The first splined recess (145) of the angled top collar member (125) and the second splined recess (165) of the bottom collar member (160) are configured to cooperate to detachably grip the fishing rod (155) in a position substantially transverse to the position of the curved handle (105) (substantially as shown in FIG. 2). The splines of the first splined recess (145) and the second splined recess (165) are configured to prevent the fishing rod (155) from twisting, snapping or being damaged when downward and side to side forces are applied thereto.

The angled top collar member (125) and bottom collar member (160) may be constructed from any desired material sufficient to permit the fishing rod handle assembly (100) to be detachably connected to a standard fishing rod, such as fishing rod (155) and sufficient to be used by a fisherman, to pull up, down and side-to-side on the fishing rod handle assembly (100) without breaking or damaging the fishing rod or the fishing rod handle assembly (100). Preferably, the angled top collar member (125) and bottom collar member (160) are constructed from plastic, fiberglass, graphite, or carbon fiber. Plastic, fiberglass, graphite and carbon fiber are rigid, yet flexible, and non-conductive making them a preferred material for construction of the angled top collar member (125) and bottom collar member (160).

It should be understood, however, that the angled top collar member (125) and bottom collar member (160) may be constructed from any material that is sufficiently durable, strong and lightweight. For example, the angled top collar member (125) and bottom collar member (160) may be constructed from metals, alloys, wood, composite materials, resins, synthetic fiber, reinforced fiber, reinforced composite material, combinations thereof and the like. Further in some embodiments, the angled top collar member (125) and bottom collar member (160) may include reinforcing or bracing structures to increase the strength and durability of the angled top collar member (125) and bottom collar member (160), such as struts, ribs, braces, rods, or any other suitable reinforcing or bracing structure, or combinations thereof and the like.

The angled top collar member (125) is angled such that the upper middle portion (135) is elevated a distance above the first lower end (130) and the second lower end (140). The angle between the upper middle portion (135) and the first lower end (130) and second lower end (140) provides increased strength to the fishing rod handle assembly (100) to reduce the likelihood of the fishing rod handle assembly (100) breaking upon side-to-side and downward forces being applied thereto. The degree of the angle between the upper middle portion (135) the first lower end (130) and the second lower end (140), may be any desired angle sufficient to reduce the likelihood of the fishing rod handle assembly (100) breaking upon such side-to-side and downward forces being applied thereto.

The bottom collar member (160) is generally rectangular or square in shape and is configured to be attached directly below the upper middle portion (135) of the angled top collar member (125), such that the first splined recess (145) of the angled top collar member (125) and the second splined recess (165) of the bottom collar member (160) cooperate to detachably grip the fishing rod (155) in a position substantially transverse to the position of the curved handle (105) (substantially as shown in FIG. 2). It being understood however, that the shape of the bottom collar member (160) may be any desired shape sufficient to permit the fishing rod handle assembly (100) to function as described herein.

To detachably connect the bottom collar member (160) to the angled top collar member (125), one or more screws (111) or bolts, for example, are threaded up and through one or more openings (113) in the bottom collar member (160) and into one or more openings (113) in the angled top collar member (125) to secure the angled top collar member (135) to the bottom collar member (160). It is to be appreciated, however, that the angled top collar member (135) may be detachably connected to the bottom collar member (160) in any desired manner such as via welds, seams, joints, bars, screws, bolts, adhesives, hooks, loops, rings, combinations thereof and the like.

In some embodiments, the first lower end (130) and the second lower end (140) of the angled top collar member (125) contain one or more openings (113) extending therethrough. As shown in FIG. 6, in some embodiments, the one or more openings (113) are constructed to form an upper ledge (117) and a lower edge (118) such that when the curved handle (105) is attached thereto, a portion of the first end (110) and second end (115) of the curved handle rest upon and are secured by the upper ledge (117).

Similarly, in some embodiments, the first leg member (205) and the second leg member (220) are attached to the angled top collar member (125), by inserting an upper portion of the first leg member (205) and an upper portion of the second leg member (220) into one or more openings (113) located in the first lower end (130) and the second lower end (140) so that the first leg member (205) and the second leg member (220) are up against and secured by the lower edge (118).

A screw (111), or bolt, for example, may then be inserted through one or more opening (113) in the first leg member (205) and another screw (111), or bolt, for example, may be inserted through one or more opening (113) in the second leg member (220) into the first lower end (130) and the second lower end (140) of the angled top collar member (125) and into one or more opening (113) in the first end (110) and the second end (115) of the curved handle (105) to secure the curved handle (105) and secure the first leg member (205) and second leg member (220) to the angled top collar member (125).

A person may use the fishing rod handle assembly (100) as follows. Under ordinary circumstances, the fishing rod handle assembly (100) is detachably connected to a standard fishing rod (155). The fishing rod (155) is positioned between the first splined recess (145) of the angled top collar member (125) and the second splined recess (165) of the bottom collar member (160). The bottom collar member (160) is then connected to the angled to collar member (125) so that the fishing rod (155) is gripped by and between the first splined recess (145) and second splined recess (165). The first splined recess (145) and the second splined recess (165) cooperate to grip the fishing rod (155) in a position substantially transverse to the position of the curved handle (105) (substantially as shown in FIG. 2) so as to prevent the fishing rod (155) from twisting or breaking upon a downward or side to side force being applied.

Once the fishing rod (155) is properly attached to the fishing rod handle assembly (100) the fishing line (190) is pulled through the substantially low rise line guide (185) and through the eyelets of the fishing rod (155). A user may then attach a hook assembly and bait to the fishing rod (155) and cast the fishing rod (155) using the reel positioned on the standard fishing rod (155). In the event a fish is caught, a user may pull up and side-to-side using the curved handle (105) and may position the first leg member (205) and second leg member (220) on the side of a boat or other surface for support or additional leverage, as needed.

It is to be appreciated that embodiments of the fishing rod handle assembly may be shipped with the fishing rod handle assembly fully or partially assembled, or with the fishing rod handle assembly fully or partially disassembled in the form of a kit, as will be readily appreciated by persons of ordinary skill in the art having the benefit of the instant disclosure.

From the above description, it is clear that the inventive concepts disclosed herein are adapted to carry out the objects and to attain the advantages mentioned herein as well as those inherent in the inventive concepts disclosed herein. While exemplary embodiments of the inventive concepts disclosed herein have been described for purposes of this disclosure, it will be understood that numerous changes may be made which will readily suggest themselves to those skilled in the art and which are accomplished within the broad scope of the inventive concepts disclosed herein and defined by the appended claims.

What is claimed is:

1. A fishing rod handle assembly comprising:
   a curved handle having a first end a second end and a middle portion extending therebetween, the middle portion vertically offset from the first end and the second end, the curved handle for grasping by a fisherman with both hands in a side-by-side position and for controlling the twisting of a fishing rod caused by reeling;
   an angled top collar member having a first lower end, an upper middle portion and a second lower end, the upper middle portion having a first splined recess therein for gripping the fishing rod, the first lower end of the angled top collar member detachably connected to the first end of the curved handle and the second lower end of the angled top collar member detachably connected to the second end of the curved handle such that the angled top collar member extends between the first end and the second end of the curved handle;
   a bottom collar member having a second splined recess therein for gripping the fishing rod, the bottom collar member detachably connected to the upper middle portion of the angled top collar member;
   wherein the first splined recess of the angled top collar member and the second splined recess of the bottom collar member are configured to detachably grip the fishing rod in a position substantially transverse to the position of the curved handle; and
   a substantially rectangular low-rise line-guide for guiding a fishing line therethrough, the substantially low-rise line-guide for controlling the side to side effect of reeling the fishing line and configured to permit the curved handle to maintain a substantially low elevation above the fishing rod, the substantially rectangular low-rise line-guide connected to the upper middle portion of the angled top collar member.

2. The fishing rod handle assembly of claim 1, further comprising:
   a first leg member detachably connected to and extending below the first lower end of the angled top collar member, the first leg member configured to support the fishing rod handle assembly on a surface; and
   a second leg member detachably connected to and extending below the second lower end of the angled top collar member, the second leg member configured to support the fishing rod handle assembly on the surface.

3. The fishing rod handle assembly of claim 2 wherein the first leg member and the second leg member telescopically extend to a deployed position and retract to a stowed position.

4. The fishing rod handle assembly of claim 1, further comprising padding connected to the middle portion of the curved handle.

5. The fishing rod handle assembly of claim 1 wherein the curved handle is substantially tubular.

6. The fishing rod handle assembly of claim 1 wherein the curved handle is substantially U shaped.

7. The fishing rod handle assembly of claim 1 further comprising a first harness ring connected to the first lower end of the angled top collar member and a second harness ring connected to the second lower end of the angled top collar member, the first harness ring and the second harness ring configured to detachably conned a harness thereto for increased leverage and support.

* * * * *